United States Patent [19]

Redick

[11] Patent Number: 4,785,980

[45] Date of Patent: Nov. 22, 1988

[54] SKI CARRIER

[76] Inventor: Ronald L. Redick, 18033 N. Shore Estates, Spring Lake, Mich. 49456

[21] Appl. No.: 26,146

[22] Filed: Mar. 16, 1987

[51] Int. Cl.[4] .............................................. B60R 9/06

[52] U.S. Cl. .......................... 224/42.03 A; 206/315.1; 211/70.5; 224/42.07; 224/917

[58] Field of Search ..................... 224/42.01, 917, 922, 224/42.03 R, 42.03 A, 42.07; 211/70.5; 294/147; 206/315.1; 280/814

[56] References Cited

U.S. PATENT DOCUMENTS

| | | | |
|---|---|---|---|
| 1,798,239 | 3/1931 | Welker et al. . | |
| 2,106,503 | 1/1938 | Hendrick | 224/42.03 R |
| 2,220,292 | 11/1940 | Schmidt . | |
| 2,602,676 | 7/1952 | Fieldhouse . | |
| 2,745,558 | 5/1956 | Greenspan . | |
| 2,764,381 | 9/1956 | Anderson | 224/42.01 X |
| 2,907,483 | 10/1959 | Prag . | |
| 2,999,378 | 9/1961 | Blair . | |
| 3,242,704 | 3/1966 | Barreca . | |
| 3,378,182 | 4/1968 | McMiller . | |
| 3,504,405 | 4/1970 | Elliott-Smith . | |
| 3,744,688 | 7/1973 | Kezer | 224/922 X |
| 3,854,641 | 12/1974 | Kohls . | |
| 3,876,123 | 4/1975 | Stuntz . | |
| 3,905,214 | 9/1975 | Bell . | |
| 3,972,457 | 8/1976 | Kesler . | |
| 4,078,708 | 3/1978 | Mayer . | |
| 4,189,074 | 2/1980 | Davies . | |
| 4,268,050 | 5/1981 | Kennedy, Sr. . | |
| 4,415,092 | 11/1983 | Boyer . | |
| 4,508,229 | 4/1985 | Yost, Jr. | 211/70.5 |
| 4,678,087 | 7/1987 | York | 211/70.5 |

FOREIGN PATENT DOCUMENTS

| | | | |
|---|---|---|---|
| 355238 | 12/1937 | Italy | 224/42.03 R |

*Primary Examiner*—Henry J. Recla
*Assistant Examiner*—Robert Petrik
*Attorney, Agent, or Firm*—Robert W. Stevenson

[57] ABSTRACT

A ski carrier is disclosed, which includes a frame, a locking bar and a plurality of elongated tubes into which skis are placed and locked in position by the locking bar.

7 Claims, 3 Drawing Sheets

SKI CARRIER

BACKGROUND OF THE INVENTION

This invention relates to carriers for carrying skis on motor vehicles.

There have been a variety of carriers which have been developed for carrying skis on cars, vans or other motor vehicles. Many such carriers have been designed for mounting on the roof of a motor vehicle. The roof-mounted carriers have several obvious disadvantages. They are difficult to mount on the vehicle, and it is difficult to put skis into them, particularly when the roof of the vehicle is high.

There are also carriers which mount on the rear of the vehicle. However, rear-mounted carriers are exposed to impacts from other vehicles or to damage by inadvertently backing the vehicle into fixed objects.

Some impacts, of course, are not sufficient to damage the vehicle. But the same impact can be sufficient to damage the skis in the carrier, as well as the carrier itself. Rear-mounted carriers, nonetheless, are typically easy to mount on vehicles because installation does not require reaching up to or over the tops of vehicles. Furthermore, skis are typically easy to mount in rear-mounted carriers.

SUMMARY OF THE INVENTION

The present invention is a rear-mounted ski carrier which affords significant protection to skis against so-called fender-benders", impacts which do not ordinarily cause much damage to a vehicle. The carrier of this invention is also a convenient rack for storing skis when neither the skis nor the carrier are in use.

The present invention is a ski carrier which includes a frame having spaced vertical side supports, a lower frame member extending horizontally between the lower ends of said side supports, and an upper frame member extending between the upper ends of said side supports. The upper frame member includes a locking bar. A plurality of elongated tubes are mounted between the side frame members under the locking bar. The carrier includes mounting means for mounting it to a vehicle.

Skis can be placed in the tubes, and the locking bar locks the skis into the carrier. The elongated tubes protect the skis from damage, while the locking bar securely holds the skis in the tubes.

The elongated tubes and frame construction of the carrier of this invention provides substantial protection for skis.

DETAILED DESCRIPTION OF THE PREFERRED EMBODIMENT

Figure 1:
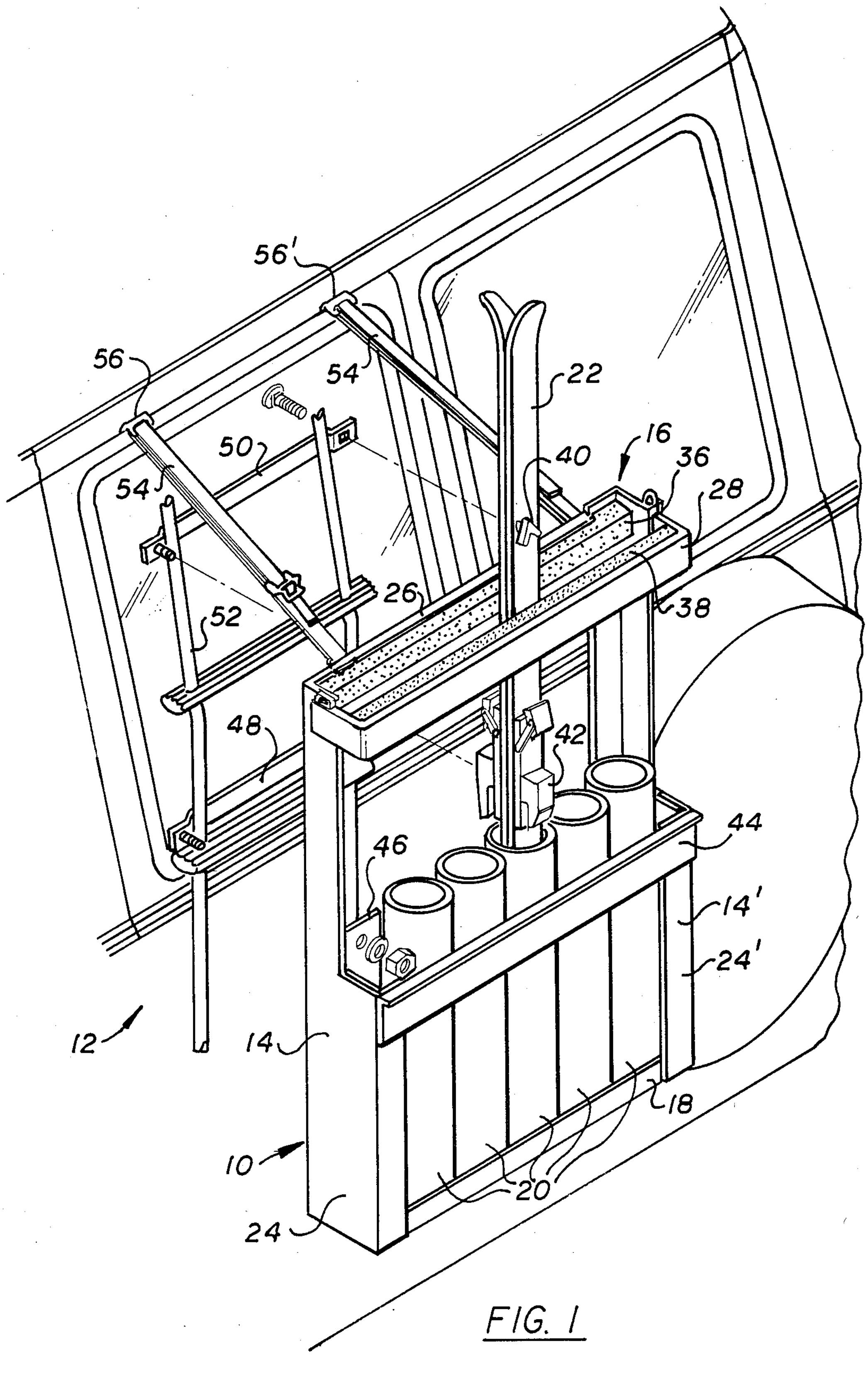
FIG. 1 is a front perspective view of the ski carrier of this invention mounted on the rear of a vehicle.

The ski carrier 10 of this invention is shown in FIG. 1 mounted on a vehicle 12. Carrier 10 includes two vertical side supports 14, 14' spaced from each other. Joining and extending between the upper ends of side supports 14 and 14' is a locking bar assembly 16. A channel member 18 joins the lower ends of side supports 14 and 14'. Positioned parallel to and between supports 14 and 14' are a plurality of elongated tubes 20 into which skis 22 are placed for protection. Lock bar 16 holds the skis in place, and can be locked to thwart theft.

Side supports 14 and 14' are made of metal, preferably a lightweight aluminum. As shown in FIG. 1, each side support 14 (or 14') is made of "angle-iron" type material—material with two perpendicular flanges. This imparts strength to the side supports. Each side support is wider across its lower half than its upper half. The wider lower half of each side support forms a three-sided vertical channel 24 (or 24'). Tubes 20 are positioned within and between the two vertical channels 24 and 24' which are oriented to face each other.

Locking bar 16 joins and extends between the upper ends of side supports 14 and 14'. Locking bar 16 includes a fixed member 26 which is fixed at each of its ends to a side support 14 or 14'. Fixed member 26 forms an upper horizontal frame member of carrier 10. Locking bar 16 also includes a pivotal member 28 which is hinged to one end of fixed member 26 by hinge 30. The free end of pivotal member 28 includes a shackle 32 or other locking means which releasably locks the free end of pivotal member 28 to the other end of fixed member 26. Shackle 32 can be locked with a padlock 34.

The opposing surfaces of fixed member 26 and pivotal member 28 include pads 36 and 38, respectively. When shackle 32 is released, pivotal member 28 can be pivoted away from fixed member 26. When skis 22 are placed on carrier 10, pivotal member 28 is pivoted toward fixed member 26, and shackle 32 is locked. When pivotal member 26 is in the locked position (FIGS. 1 and 2), pads 36 and 38 compress skis 22 between them, and cushion the skis against damage. The distance between fixed member 26 and pivotal member 28 when the latter is locked is sufficiently small to prevent skis from being pulled upwardly out of the carrier. In fact, locking bar 16 is positioned so as to clamp skis between their toe bindings 40 and heel bindings 42. The bindings prevent the skis from being pulled out of the small gap between the fixed and pivotal members of locking bar 16.

Channel member 18 spans between and is fastened to the lower ends of side supports 14 and 14'. Channel member 18 forms an upwardly oriented trough in which the lower ends of tubes 20 are nested. Channel member 18 is also made of a lightweight, durable aluminum and forms a lower horizontal frame member for carrier 10.

Figure 5:
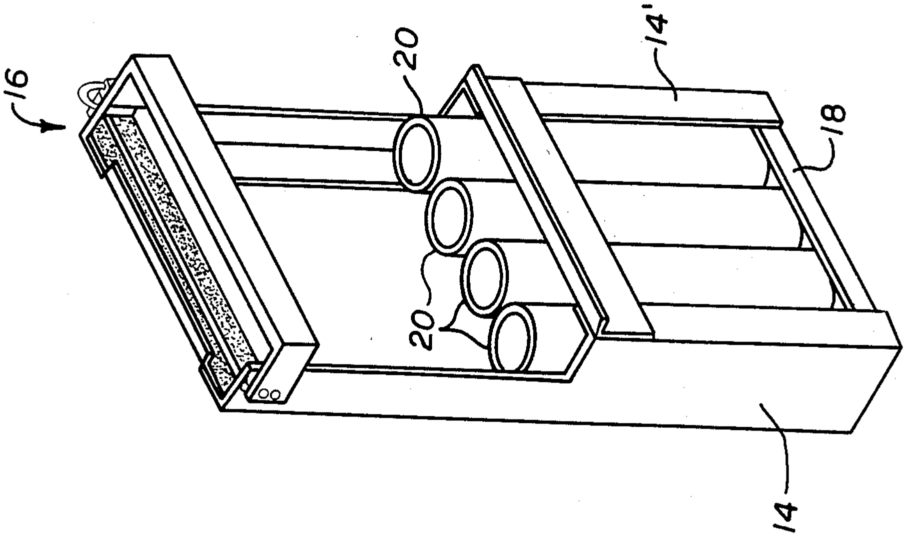
FIG. 5 is a front perspective view of an alternative embodiment of the ski carrier of this invention.
Figure 2:
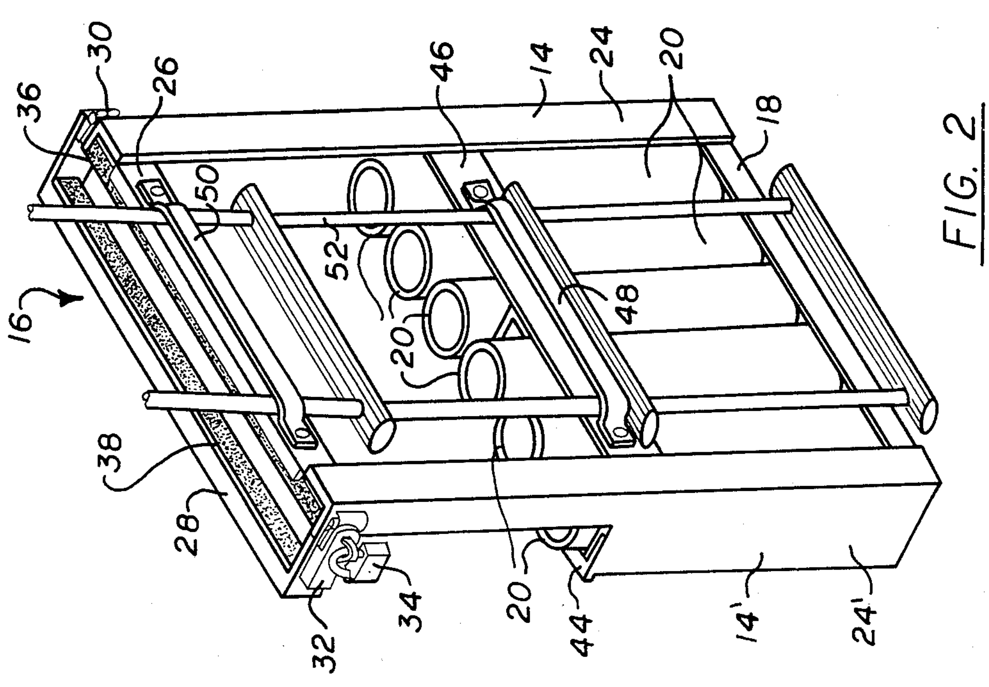
FIG. 2 is a rear perspective view of the ski carrier of this invention.

Tubes 20 are elongated lengths of thick-walled PVC tubing. Tubes 20 should be long enough to enclose the end of a ski behind the heel binding. Six tubes are shown in FIGS. 1 and 2 but fewer (FIG. 5) or more tubes (not shown) can be provided with such a carrier. The upper ends of tubes 20 fit interferingly between frame members 44 and 46 (described below). The lower ends of tubes 20 fit interferingly within channel member 18. Thus, tubes 20 are held by frame members 44 and 46 and by channel member 18 with a tight friction fit. This facilitates manufacture of carrier 10. In the event that an impact cracks or breaks one or more tubes, the damaged tubes can be easily replaced. Since tubes 20 are made from standard diameter PVC tubing available commercially, the user can buy PVC tubing with the appropriate diameter, cut the tubing to the appropriate length, and replace the damaged tube(s).

It is preferred that tubes 20 be made of PVC or other plastic. In the event of a collision, a tube made of plastic will not deform permanently to trap the skis in the tube. A metal tube, however, may bend and retain the skis in the tube if the tube is crushed upon impact. Plastic tubes also are lightweight and inexpensive, too.

Intermediate frame members 44 and 46 extend between side supports 14 and 14'. Intermediate frame member 44 is positioned across the front of carrier 10 adjacent the upper ends of tubes 20. Intermediate frame member 46 extends across the rear of carrier 10 adjacent the upper ends of tubes 20 and parallel to intermediate frame member 44. Intermediate frame members 44 and 46 are spaced from each other so as to retain tubes 20 between them. The upper ends of tubes 20 are fastened to intermediate frame members 44 and 46 as described above.

Carrier 10 can mounted to a motor vehicle 12 in a variety of ways. As shown in FIGS. 1 and 2, for example, metal straps 48 and 50 can be used to mount carrier 10 to a ladder 52 on a door of vehicle 12. Adjustable fabric straps 54, 54' can be used to secure the upper part of carrier 10 to the vehicle door. Clips 56, 56' hook onto the vehicle door and provide mounts for straps 54 and 54', respectively.

Figure 3:
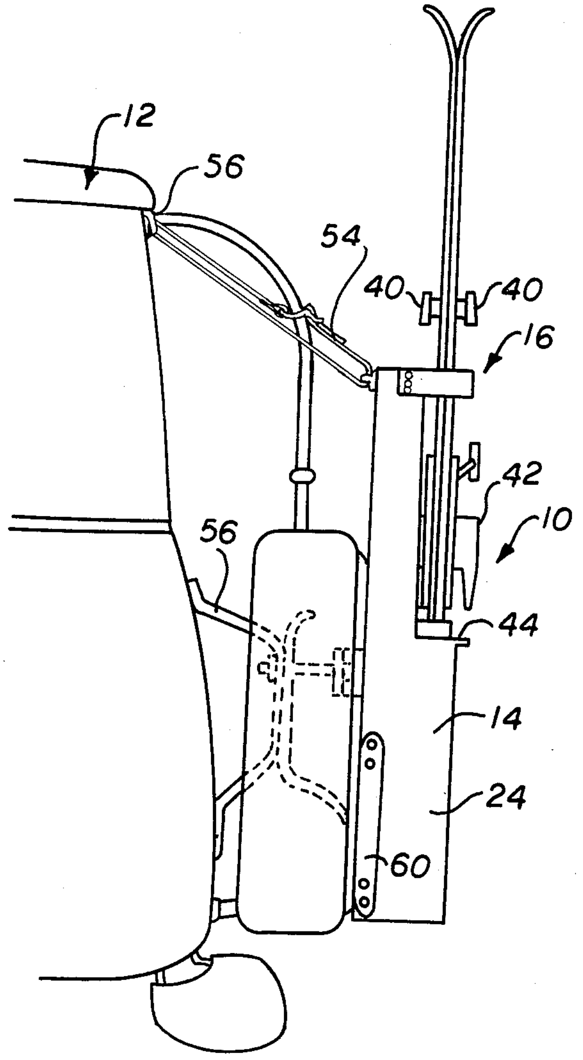
FIG. 3 is a side view of the ski carrier of this invention from the left side of FIG. 1.

Alternatively, carrier 10 can be mounted on the spare tire mounting bracket 56 (FIG. 3) by screws or quick-release fasteners. In fact, carrier 10 can be mounted directly over the spare tire.

Finally, carrier 10 can be mounted on its own mounting bracket (not shown) to a vehicle bumper or door.

Figure 4:
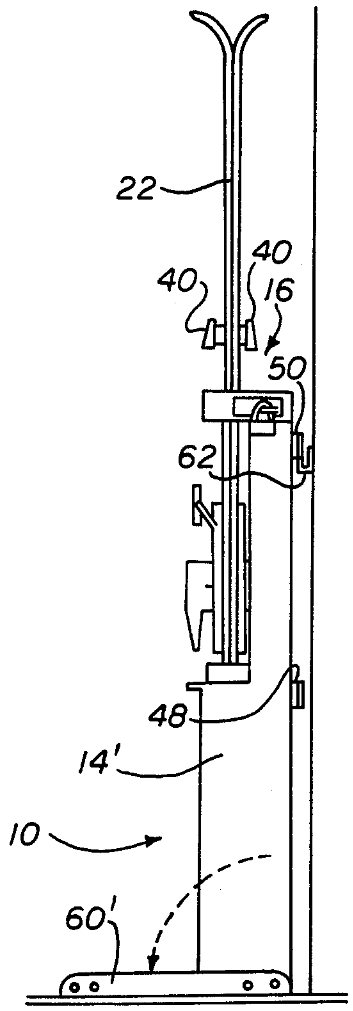
FIG. 4 is a side view of the ski carrier of this invention from the right side of FIG. 1, shown with the carrier being used as a storage rack.

When carrier 10 is removed from the vehicle (FIG. 4), it is a handy storage rack for skis. Pivotal legs 60, 60' (FIGS. 3 and 4) mounted on the lower ends of side supports 14 and 14', respectively, are pivoted downwardly to brace carrier 10 and prevent it from tipping. Alternatively or additionally, a wall mounting bracket 62 can be used to support carrier 10 from strap 50.

As can be seen, the ski carrier of this invention is a convenient rear-mounted carrier for skis. To place skis in the carrier, the locking bar is opened, and skis easily placed in the tubes provided. The skis can be held securely in place by closing the locking bar. Even though it is rear-mounted, the carrier of this invention provides good protection for skis. The elongated tubes and durable frame construction protect the skis during transport or in the event of minor "fender benders" which may otherwise damage the skis.

While one embodiment of this invention has been shown, modifications will be apparent to those skilled in the art. Such modifications are to be included within the ambit of this invention, unless the claims which follow expressly state otherwise.

I claim:

1. A carrier for skis and the like, comprising:

a frame comprising spaced vertical side frame members, a lower frame member extending horizontally between the lower ends of said side frame members, and an upper frame member extending horizontally between the upper ends of said side frame members, said upper frame member including locking means to releasably secure skis to said upper frame member;

a plurality of elongated tubes mounted between said side frame members, under said locking means; and a pair of intermediate frame members extending between said side frame members, positioned below said upper frame member and above said lower frame member, said tubes being retained in the carrier by an interference fit between said intermediate frame members;

mounting means for releasably mounting said carrier on a vehicle;

whereby skis can be placed in said elongated tubes and held in said carrier by said locking means.

2. The carrier as recited in claim 1 wherein said locking means includes a pivotal bar mounted on one end of said upper frame member and releasably fastened to the other end of said upper frame member by a locking device.

3. The carrier as recited in claim 1 which further includes pivotal floor braces pivotally mounted on the lower ends of said side frame members, whereby said carrier can be braced against tipping if said carrier is used as a storage rack for skis.

4. The carrier as recited in claim 1 wherein said side frame members include channel portions, said lower frame member is channel shaped, and wherein the lower ends of said tubes rest in the channel in the lower frame member, and said tubes are supported between said channel portions of said side frame members.

5. The carrier as recited in claim 1 wherein said tubes are made of material which will not deform permanently upon impact.

6. The carrier as recited in claim 5 wherein said tubes are made from plastic.

7. A carrier for skis, comprising:

two spaced parallel side frame members, each of said frame members having first and second ends;

a channel member extending between and secured to the first ends of said side frame members, said channel being opened toward said second ends of said side frame members;

a locking bar assembly extending between the second ends of said side frame members, said locking bar assembly including (1) a stationary member fixed to and between said second ends and (2) a pivotal member hingeably mounted on one end of said stationary member and releasably lockable to the other end of said stationary member;

two spaced intermediate frame members extending between said side frame members intermediate said locking bar assembly and said channel member;

a plurality of elongated tubes extending between said intermediate frame members and said channel member, one end of each of said tubes fitting interferingly between said two intermediate frame members and the other end of each of said tubes fitting interferingly within said channel member, whereby skis can be placed in said tubes and locked therein with said locking bar.

* * * * *